United States Patent [19]

Yong-Set

[11] Patent Number: 5,038,514

[45] Date of Patent: Aug. 13, 1991

[54] FISH STRINGER

[76] Inventor: Bernard Yong-Set, 273 Port Union Road, Scarborough, Ontario, Canada, M1C 2L3

[21] Appl. No.: 520,818

[22] Filed: May 9, 1990

[51] Int. Cl.⁵ ............................................ A01K 97/00
[52] U.S. Cl. ..................................... 43/54.1; 224/103
[58] Field of Search ........................... 43/54.1; 224/103

[56] References Cited

U.S. PATENT DOCUMENTS

| | | | |
|---|---|---|---|
| 1,975,754 | 10/1934 | Pflueger | 224/103 |
| 2,354,848 | 8/1944 | Carpenter | 224/103 |
| 2,731,180 | 1/1956 | Fricker | 224/103 |
| 2,959,333 | 11/1960 | Baggett | 224/103 |
| 3,081,577 | 3/1963 | Brown | 224/103 |
| 3,098,592 | 7/1963 | Eisman | 224/103 |
| 3,263,879 | 8/1966 | Sanderson | 224/103 |
| 4,124,154 | 11/1978 | O'Russa | 224/103 |

Primary Examiner—Kurt Rowan
Assistant Examiner—Chuck Y. Mah
Attorney, Agent, or Firm—R. Craig Armstrong

[57] ABSTRACT

The invention provides a simple fish stringer having a reclosable fastener. The invention enables persons fishing to conveniently store freshly caught fish while keeping them alive in the water, and facilitates carrying them later. The stringer involves a rod of spring metal having two ends, formed so as to define a generally triangular shape, the ends being fastenable to each other to close the triangle. Preferably, the triangular shape is defined by a first leg, leading to an integral second leg, leading in turn to an integral third leg, the first and second legs and the second and third legs being at angles of generally less than about 45 degrees with respect to each other. Preferably, the ends are fastenable to each other by virtue of a catch formed in one end, preferably the free end of the first leg, the other end preferably being pointed. The spring metal acts to urge the first leg away from the second leg against the end of the third leg to engage the catch. Preferably, there is an integral spring loop formed between the first and second legs.

14 Claims, 2 Drawing Sheets

FISH STRINGER

BACKGROUND OF THE INVENTION

1. Field of the invention

This invention relates to a fish stringer, i.e. a device to facilitate retaining freshly-caught fish and keeping them alive in water near the dock, bridge or other shore structure or position, or from a boat or the like in water near the boat, and also to facilitate the carrying by hand of caught fish.

2. Description of the Prior Art

Containers of the prior art suitable for carrying and storing fish are most commonly in the form of a bag or basket type container. Many of the containers for storing fish do not provide any cooling relative to the ambient air temperature. Such cooling is generally required or preferred to maintain the freshness of the dead fish and to prevent spoilage. Refrigerated containers suitable for the storage of freshly caught fish tend to be bulky, and are not conveniently portable. They also occupy a significant amount of the space available in a small boat, rendering their use inconvenient and representing a fruitless and unprofitable sacrifice of comfort and manoeuvrability within the boat should no fish be caught.

It is known to use stringers of various configurations to keep fish alive to maximize freshness. However, the inventor is not aware of any stringers in the prior art which are as simple, effective and economical to manufacture as the stringer in the present invention. One stringer in the prior art comprises individual hooks and skimpy wire clips attached to a loose, free-flowing length of chain. These fish stringers tend to rust and are bulky, and care must be taken in transporting and using these fish stringers so as not to entangle the chain or to catch the hooks on other objects. Moreover, the force exerted against the fish securing means by large fish attached to fish stringers of the prior art is occasionally sufficient to detach the fish from the fish stringer, thereby resulting in the loss of the caught fish.

SUMMARY OF THE INVENTION

It is an object of the invention to provide a simple fish stringer having a reclosable fastener. Such a fish stringer has particular application for sportfishing. The invention enables persons fishing to conveniently store freshly-caught fish alive at the fishing site (thereby maintaining the freshness of the catch), by either securing the fish at the shore or by trailing them in water behind a boat or the like, if desired. The invention further provides a means to carry caught fish.

The fish stringer involves a rod of spring metal having two ends, formed so as to define a generally triangular shape, the ends being fastenable to each other to close the triangle.

Preferably, the triangular shape is defined by a first leg, leading to an integral second leg, leading in turn to an integral third leg, the first and second legs and the second and third legs being at angles of generally less than about 45 degrees with respect to each other. Preferably, the ends are fastenable to each other by virtue of a catch formed in one end, preferably the free end of the first leg, the other end preferably being pointed. The spring metal acts to urge the first leg away from the second leg against the end of the third leg to engage the catch. Preferably, there is an integral spring loop formed between the first and second legs.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE PREFERRED EMBODIMENT

Figure 1:
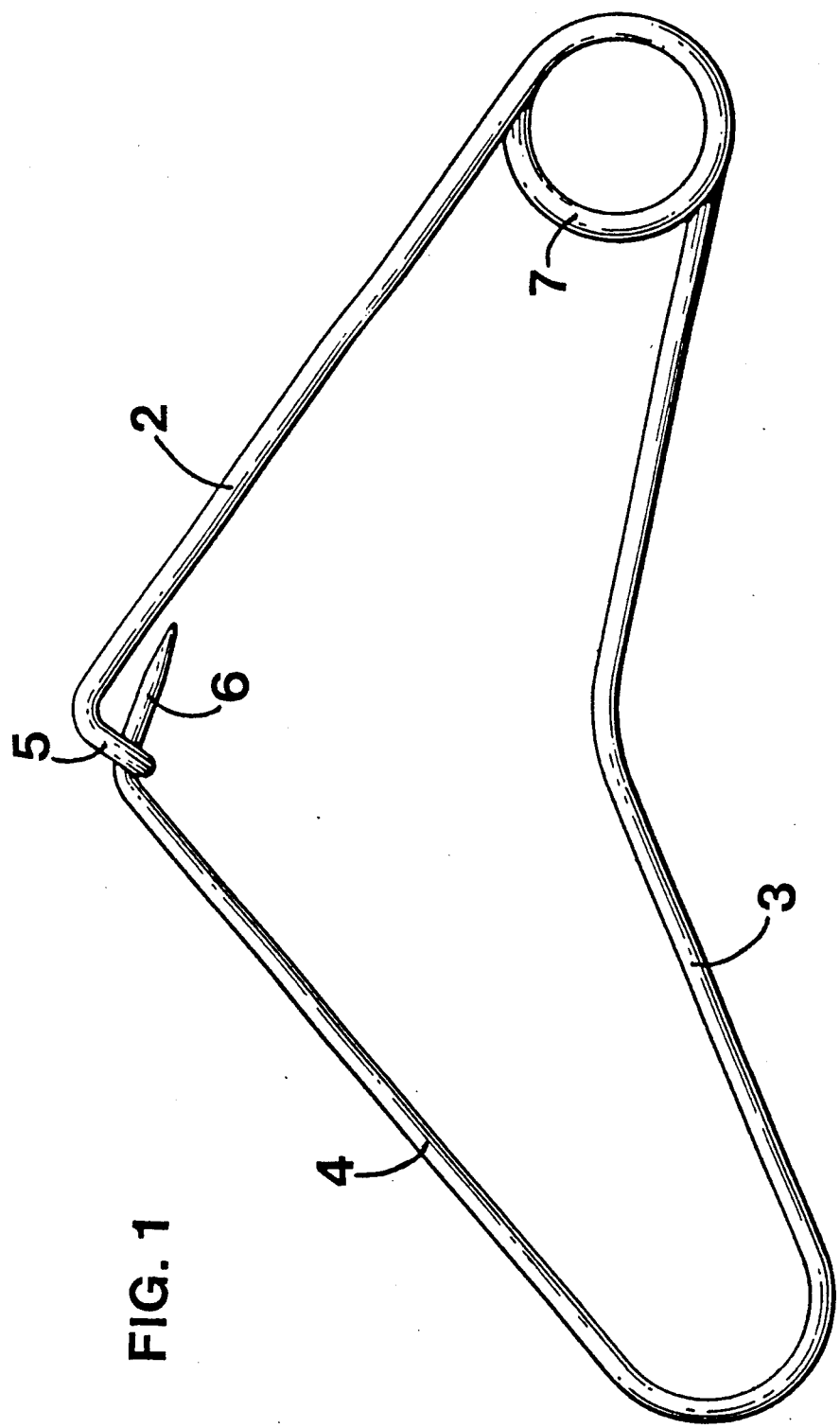
FIG. 1 is a front view of the preferred embodiment.
Figure 2:
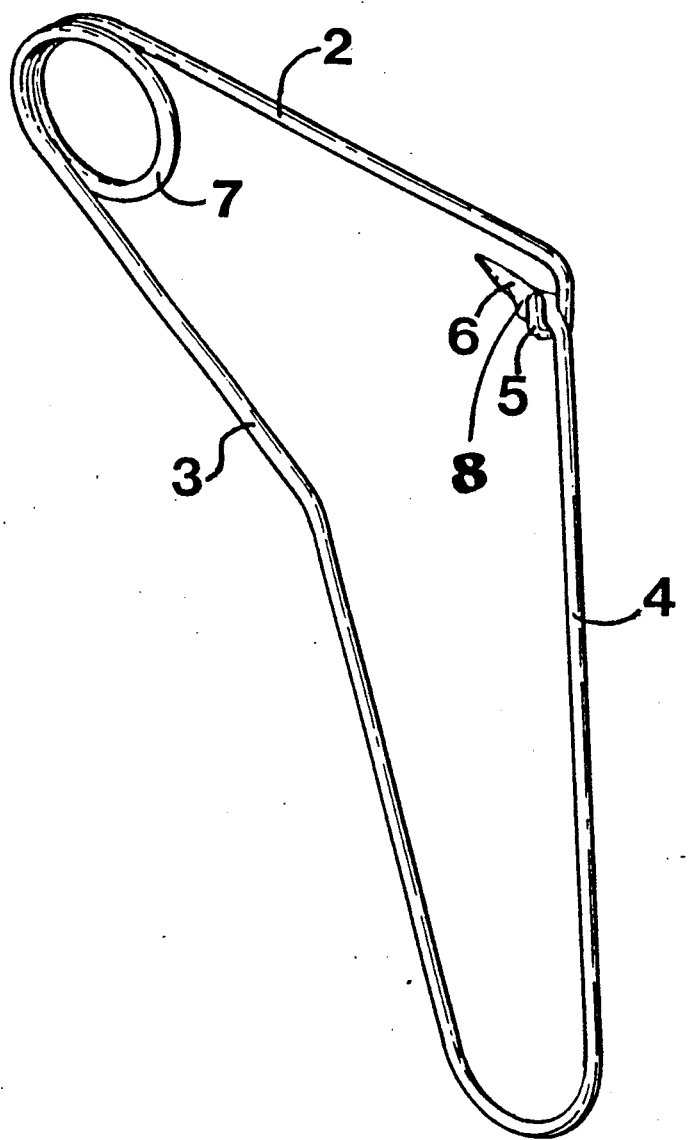
FIG. 2 is a perspective view of the preferred embodiment.

Referring to FIG. 1, the preferred embodiment of the fish stringer is of a single piece of stainless spring steel rod, 0.187 inches in diameter, formed into a generally triangular shape having a length of about 10 inches. The ends are fastenable to each other to close the triangle. It will be appreciated that the exact material, diameter and dimensions could be readily varied.

The triangular shape is defined by a first leg 2, leading to an integral second leg 3, leading in turn to an integral third leg 4, the first and second legs and the second and third legs being at angles of generally less than about 45 degrees with respect to each other. The ends are fastenable to each other by virtue of a catch 5 formed in one end, namely the first end in the preferred embodiment. The other end, i.e. the second end 6, preferably is pointed. The spring metal acts to urge the first leg 2 away from the second leg 3 against the end of the third leg 4 to engage the catch 5. Preferably, there is an integral spring loop 7 formed between the first and second legs to improve the spring effect.

Although any suitable catch may be used, the simplest catch 5 is simply a U-shaped hook formed at the end of the first leg, projecting at a right angle from the plane of the stringer.

In operation, the user squeezes the first and second legs towards each other, which opens the catch 5 and exposes the pointed end 6. Fish caught may be impaled through their lower mandible on the pointed end and then slid down the third leg 4 as more fish are added to the stringer. Releasing the stringer causes the first leg 2 to move back to close the catch. The strength of the point upon which fish are impaled, and the simplicity of the means used to fasten the fish stringer closed render use of the fish stringer simple, convenient and reliable, particularly under conditions often found when fishing—i.e. in the dark and with hands numbed by cold water.

Since the stringer is preferably made of stainless steel, rust is not a problem, and the stringer can be stored under water or in a damp environment. Securing the fish to the fish stringer through the fish's lower mandible leaves the fish's gills undamaged and unhindered, permitting fish strung upon the fish stringer to continue breathing upon return of the fish stringer and impaled fish to the body of water in which it was caught, thereby keeping the fish alive, and maintaining the freshness of caught fish strung upon the fish stringer.

To improve the operation of the catch 5, the end of the third leg 4 is preferably bent inwardly, i.e. generally back towards the spring loop 7 and in general alignment with the first leg 2. This also improves safety, by minimizing the exposure of the pointed end. To further improve the operation, by virtually eliminating any possibility of the catch being pulled open accidentally, the end of the third leg may have a flattened portion 8 which is too large to be pulled back through the catch 5.

To facilitate use of the stringer, the second leg 3 may be bent as illustrated, to move a portion of the second leg closer to the first leg, making the stringer easier to grasp and making it easier to squeeze the first and second legs towards each other to release the catch.

The integral spring loop 7, in addition to improving the spring, enables a rope or the like to be looped through it to secure the stringer, allowing the stringer to be trailed in the water near a boat or secured from shore.

It will be appreciated that the above description relates to the preferred embodiment by way of example only. Many variations on the invention will be obvious to those knowledgeable in the field, and such obvious variations are within the scope of the invention as described and claimed, whether or not expressly described.

For example, it is anticipated that the invention may be made in a range of sizes, and in a variety of shapes and materials. The shape obviously does not need to be exactly as described above and illustrated in the drawings.

What is claimed as the invention is:

1. A fish stringer comprising a rod of spring metal having two ends, formed so as to define a generally triangular shape with said ends meeting at one apex of said generally triangular shape, the ends being fastenable to each other at said apex to close the triangle, the rod on the side of the generally triangular shape opposite said apex being bent inwardly towards said apex, thereby reducing the angle between said side and the portions of said rod leading towards said apex.

2. A fish stringer as recited in claim 1, in which said generally triangular shape is defined by a first leg, leading to an integral second leg, leading in turn to an integral third leg, said first and second legs and said second and third legs being at angles of generally less than about 45 degrees with respect to each other.

3. A fish stringer as recited in claim 2, in which said ends are fastenable to each other by virtue of a generally U-shaped catch formed in one said end, said spring metal rod acting to urge said first leg away from said second leg to engage said other end in said catch, said other end being bent inwardly to align roughly with the direction of the leg in which the catch is defined.

4. A fish stringer as recited in claim 3, in which said catch is formed in the end of said first leg, and in which the end of said third leg engages said catch, said catch being urged away from said second leg against the end of said third leg.

5. A fish stringer as recited in claim 4, in which the end of said third leg is pointed to facilitate skewering a fish.

6. A fish stringer as recited in claim 3, in which one said end is pointed to facilitate skewering a fish.

7. A fish stringer as recited in claim 2, further comprising an integral spring loop formed between said first and second legs.

8. A fish stringer as recited in claim 7, in which one said end is pointed to facilitate skewering a fish.

9. A fish stringer as recited in claim 7, in which said ends are fastenable to each other by virtue of a generally U-shaped catch formed in one said end, said spring metal rod acting to urge said first leg away from said second leg and against said third leg to engage said other end in said catch, said other end being bent inwardly to align roughly with the direction of the leg in which the catch is defined.

10. A fish stringer as recited in claim 9, in which one said end is pointed to facilitate skewering a fish.

11. A fish stringer as recited in claim 9, in which said catch is formed in the end of said first leg, and in which the end of said third leg engages said catch, said catch being urged away from said second leg against the end of said third leg.

12. A fish stringer as recited in claim 11, in which the end of said third leg is pointed to facilitate skewering a fish.

13. A fish stringer as recited in claim 2, in which one said end is pointed to facilitate skewering a fish.

14. A fish stringer as recited in claim 1, in which one said end is pointed to facilitate skewering a fish.

* * * * *